(12) United States Patent
Price et al.

(10) Patent No.: US 12,086,970 B2
(45) Date of Patent: Sep. 10, 2024

(54) INTENSITY THRESHOLDING-BASED IMAGE MODIFICATION FOR COMPUTER VISION

(71) Applicant: The Boeing Company, Chicago, IL (US)

(72) Inventors: Caleb G. Price, Hazelwood, MO (US); Jeffrey H. Hunt, El Segundo, CA (US)

(73) Assignee: The Boeing Company, Arlington, VA (US)

( * ) Notice: Subject to any disclaimer, the term of this patent is extended or adjusted under 35 U.S.C. 154(b) by 418 days.

(21) Appl. No.: 17/448,861

(22) Filed: Sep. 24, 2021

(65) Prior Publication Data

US 2022/0198624 A1   Jun. 23, 2022

Related U.S. Application Data (60) Provisional application No. 63/126,796, filed on Dec. 17, 2020.

(51) Int. Cl.
| | |
|---|---|
| *G06T 5/40* | (2006.01) |
| *B64D 47/08* | (2006.01) |
| *G06T 5/50* | (2006.01) |
| *G06T 5/92* | (2024.01) |
| *G06V 10/50* | (2022.01) |

(Continued)

(52) U.S. Cl.
CPC .............. *G06T 5/92* (2024.01); *B64D 47/08* (2013.01); *G06T 5/40* (2013.01); *G06T 5/50* (2013.01); *G06V 10/507* (2022.01); *H04N 23/71* (2023.01); *H04N 23/76* (2023.01); *G06T 2207/10032* (2013.01); *G06T 2207/10048* (2013.01)

(58) Field of Classification Search
CPC .... G06T 5/92; G06T 5/40; G06T 5/50; G06T 2207/10032; G06T 2207/10048; G06T 5/94; G06T 2207/10016; G06T 2207/30261; G06T 7/11; G06T 7/136; B64D 47/08; G06V 10/507; G06V 10/25; G06V 10/56; G06V 10/60; G06V 10/50; H04N 23/71; H04N 23/76; H04N 5/33
See application file for complete search history.

(56) References Cited

U.S. PATENT DOCUMENTS

| | | |
|---|---|---|
| 5,323,987 A | 6/1994 | Pinson |
| 7,999,849 B2 | 8/2011 | Neff et al. |
| 8,294,712 B2 | 10/2012 | Nelson |

(Continued)

*Primary Examiner* — Ross Varndell
*Assistant Examiner* — Dustin Bilodeau
(74) *Attorney, Agent, or Firm* — Alleman Hall & Tuttle LLP (57) ABSTRACT

A computer vision method performed by a computing system includes: receiving an image; identifying a light intensity value for each pixel of a set of pixels of the image; defining a light intensity band formed by an upper light intensity threshold and a lower light intensity threshold based on a light intensity distribution of the light intensity values of the set of pixels; for each pixel of the set of pixels, identifying whether that pixel has a light intensity value that is within the light intensity band or outside of the intensity band; and generating a modified image by increasing a light intensity contrast between a first subset of pixels identified as having light intensity values within the light intensity band and a second subset of pixels identified as having light intensity values outside of the light intensity band.

20 Claims, 5 Drawing Sheets

(51) Int. Cl.
*H04N 23/71* (2023.01)
*H04N 23/76* (2023.01)

(56) References Cited

U.S. PATENT DOCUMENTS

| | | |
|---|---|---|
| 8,509,555 B2 | 8/2013 | Meany |
| 8,615,105 B1 | 12/2013 | Cheng et al. |
| 8,811,670 B2 | 8/2014 | Mundhenk et al. |
| 9,036,910 B1 | 5/2015 | Mundhenk et al. |
| 9,086,484 B2 | 7/2015 | Medasani et al. |
| 9,129,185 B1 | 9/2015 | Murata |
| 9,292,747 B2 | 3/2016 | Baker |
| 9,501,839 B1 | 11/2016 | Korchev et al. |
| 9,508,134 B2 | 11/2016 | Jiang et al. |
| 9,715,639 B2 | 7/2017 | Kwon et al. |
| 9,727,785 B2 | 8/2017 | Kwon et al. |
| 10,176,557 B2 | 1/2019 | Jiang et al. |
| 10,366,501 B2 | 7/2019 | Ray et al. |
| 10,732,277 B2 | 8/2020 | Korchev et al. |
| 2018/0068418 A1* | 3/2018 | Jiang ................ G06T 5/40 |
| 2020/0104719 A1 | 4/2020 | Wiltshire |
| 2022/0094896 A1* | 3/2022 | Paul ................ G06F 18/24 |

* cited by examiner

INTENSITY THRESHOLDING-BASED IMAGE MODIFICATION FOR COMPUTER VISION

CROSS REFERENCE TO RELATED APPLICATIONS

This application claims priority to U.S. Provisional Patent Application Ser. No. 63/126,796, filed Dec. 17, 2020, the entirety of which is hereby incorporated herein by reference for all purposes.

FIELD

An invention of the present disclosure relates generally to computer vision, and more particularly to processing images used for object detection and tracking.

BACKGROUND

Computer vision is used in a variety of fields to partially or fully automate tasks such as visually inspecting operating environments, receiving user input as part of a human-machine interface, and controlling other machines. One aspect of computer vision includes object detection and tracking in which images are programmatically analyzed for the presence of a predefined object or object class. Such images can include individual, standalone images or a time-based series of images that form a video.

SUMMARY

A computer vision system and a method performed by the computing system are disclosed. In an example, an image is received, and a light intensity value is identified for each pixel of a set of pixels of the image. A light intensity band formed by an upper light intensity threshold and a lower light intensity threshold is defined based on a light intensity distribution of the light intensity values of the set of pixels. For each pixel of the set of pixels, that pixel is defined as having a light intensity value that is either within the light intensity band or outside of the intensity band. A modified image is generated by increasing a light intensity contrast between a first subset of pixels identified as having light intensity values within the light intensity band and a second subset of pixels identified as having light intensity values outside of the light intensity band.

DETAILED DESCRIPTION

Computer vision technologies encounter a variety of challenges, depending on the operating environment, that can result in reduced performance, such as reduced accuracy or precision, increased consumption of processing resources, increased processing time, and increased energy consumption. As an example, objects can partially occlude each other, have complex structures, or have similar visual characteristics within sampled images that make it challenging for computer vision technologies to distinguish the objects from each other. The disclosed techniques have the potential to improve the performance of computer vision technologies such as object detection, object tracking, object segmentation, and edge detection by pre-processing images to generate modified images to which the computer vision technologies can be applied.

According to an example, a light intensity band formed by an upper light intensity threshold and a lower light intensity threshold is defined based on a light intensity distribution of the light intensity values of the set of pixels. For each pixel of the set of pixels, that pixel is defined as having a light intensity value that is either within the light intensity band or outside of the intensity band. A modified image is generated by increasing a light intensity contrast between a first subset of pixels identified as having light intensity values within the light intensity band and a second subset of pixels identified as having light intensity values outside of the light intensity band.

By modifying images to increase light intensity contrast between pixels within the light intensity band and pixels outside of the light intensity band, object features located within the modified images can be accentuated while other features having higher or lower initial light intensity values outside of the light intensity band can be diminished. The modified images can be provided to downstream computer vision processes that are configured to identify features that correspond to the features accentuated by modification of the image through selective adjustment of pixel light intensity. This pre-processing approach of images has the potential to achieve increased performance of computer vision technologies as compared to the use of the images without such pre-processing.

Figure 1:
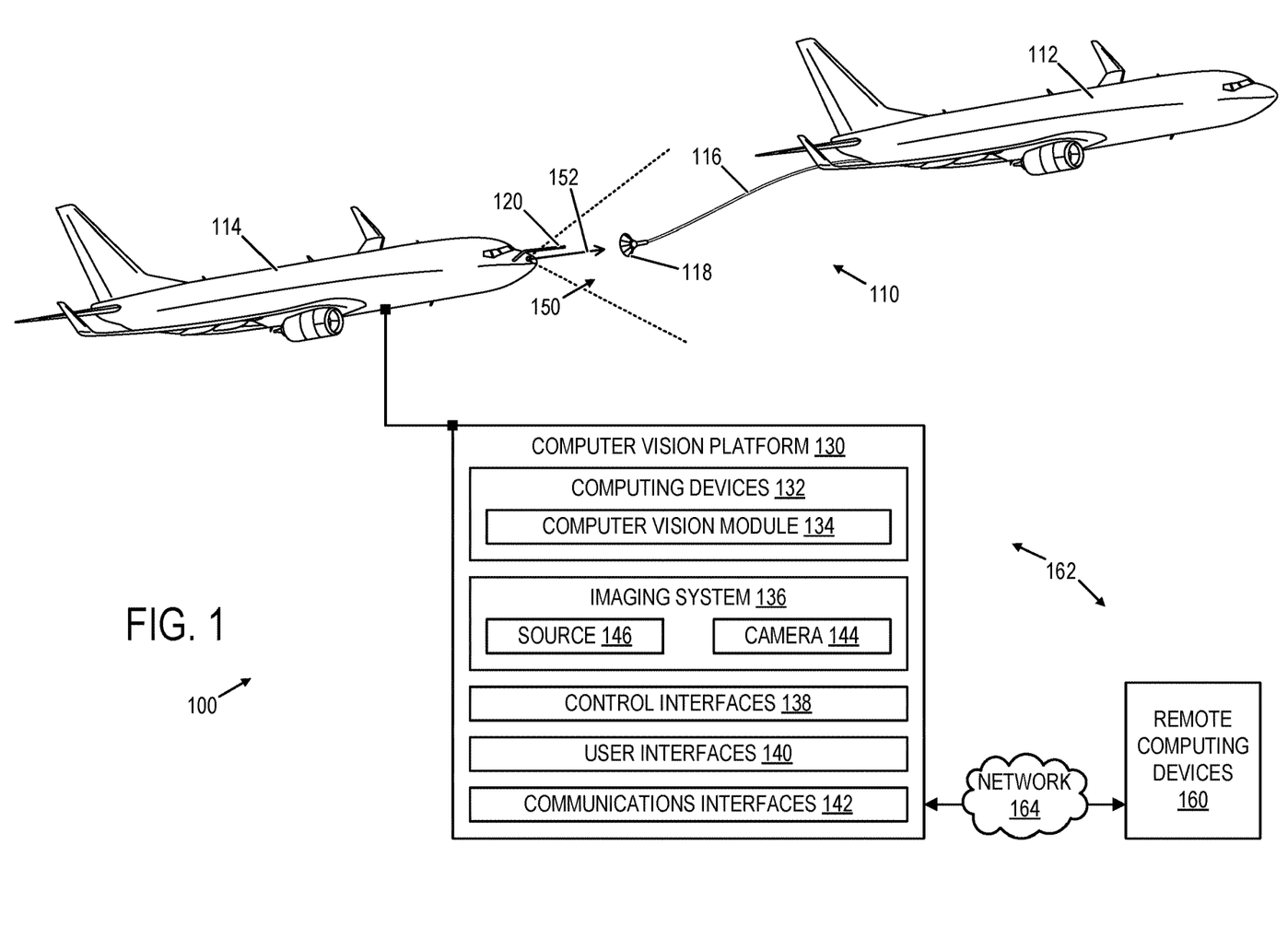
FIG. 1 is a schematic diagram depicting aspects of an example computer vision system within an operating environment.

FIG. 1 shows a schematic diagram depicting aspects of an example computer vision system 100 within an operating environment. In this example, computer vision system 100 is used within the context of an aerial refueling operation 110 in which a first aeronautical vehicle 112 supplies fuel to a second aeronautical vehicle 114 via a flexible hose 116. Within the example of FIG. 1, a probe and drogue configuration is depicted, in which a drogue 118 (e.g., a basket) mounted to hose 116 trailing first aeronautical vehicle 112 is used to capture and guide a probe 120 of second aeronautical vehicle 114 to establish a connection between the probe and a terminal end of the hose. Computer vision system 100 can be used, for example, to partially or fully automate, or otherwise assist human operators with alignment of probe 120 and drogue 118 as part of aerial refueling operation 110.

Second aeronautical vehicle 114 in this example includes a computer vision platform 130, components of which are shown schematically in further detail in FIG. 1. Components of computer vision platform 130 are located on-board second aeronautical vehicle 114 in this example. However, in other examples, some components of computer vision platform 130 can be located on-board other types of mobile platforms or can be integrated with stationary platforms.

Computer vision platform 130 can include one or more computing devices 132 that implements a computer vision module 134, an imaging system 136, one or more control interfaces 138 for controlling second aeronautical vehicle 114, one or more user interfaces 140 for interacting with human operators, and one or more communications interfaces 142 for communicating with other devices, among other suitable components.

Imaging system 136 can include one or more cameras of which camera 144 is an example. Camera 144 can be used to capture images of a scene within a field of view 150 of the camera that can be processed by computer vision system 100. Within the context of the refueling operation of FIG. 1, for example, camera 144 can be mounted to second aeronautical vehicle 114 at an orientation that is suitable for capturing images of field of view 150 that corresponds to a forward travel direction of the second aeronautical vehicle. As an example, camera 144 can be configured to capture images of drogue 118, probe 120, hose 116, and first aeronautical vehicle 112 within field of view 150.

In at least some examples, camera 144 can be paired with an illumination source 146 that is configured to project light 152 into field of view 150 that can be reflected by objects located within the field of view. As an example, camera 144 can take the form of an infrared camera that is configured to capture images within at least a portion of an infrared range of electromagnetic spectrum, and illumination source 146 can take the form of an infrared illumination source that projects light within the portion of the infrared range of electromagnetic spectrum captured by the camera.

While infrared is described as an example range of electromagnetic spectrum, camera 144 or other cameras of imaging system 136 can be configured to capture images in different ranges of electromagnetic spectrum, including visible light ranges, as an example. Illumination source 146 or other illumination sources of imaging system 136 can be similarly configured to project light of any suitable range of electromagnetic spectrum that can be captured by the cameras of the imaging system, including visible light ranges of electromagnetic spectrum. Light 152 projected by illumination source 146 can be diffuse, unstructured light, in at least some examples. However, other suitable illumination techniques can be used, including structured light, time-varying light, or a combination thereof.

Images captured by camera 144 can be processed locally at computer vision platform 130 by the one or more computing devices 132 implementing computer vision module 134. Additionally or alternatively, images captured by camera 144 can be processed remotely from computer vision platform 130, such as by one or more remote computing devices 160. As examples, remote computing devices 160 can implement an instance or component of computer vision module 134, or such processing can be performed in a distributed manner between or among computing devices 132 and remote computing devices 160 collectively implementing computer vision module 134. In the example of FIG. 1, remote computing devices 160 are located off-board second aeronautical vehicle 114. Remote computing devices 160 can be located at a stationary, terrestrial, ground-based facility or on-board a mobile platform, such as another aeronautical vehicle (e.g., first aeronautical vehicle 112), a terrestrial, ground-based vehicle or water-based vehicle, orbiting satellite, etc., as examples. Computing devices 132 and remote computing devices 160 can form a computing system 162 that is distributed and configured for coordinated processing.

Communications interfaces 142 can be configured to facilitate communications between computer vision platform 130 and remote devices, including remote computing devices 160. For example, communications between computer vision platform 130 and remote computing devices 160 can traverse one or more communication networks 164. Networks 164 can include wireless networks and wired networks, and communications over such networks can utilize any suitable communications technology and protocol.

Control interfaces 138 can include any suitable interface that can be used to provide a control input to one or more controlled devices, such as controlled devices of second aeronautical vehicle 114. For example, control interfaces 138 can be used to provide control inputs for operating second aeronautical vehicle 114. Control interfaces 138 can be operable by human operators or a machine (e.g., an auto-pilot module implemented by computing devices 132). User interfaces 140 can include input devices and output devices by which human operators can interact with computer vision platform 130, including with computing devices 132 and control interfaces 138.

Figure 2:
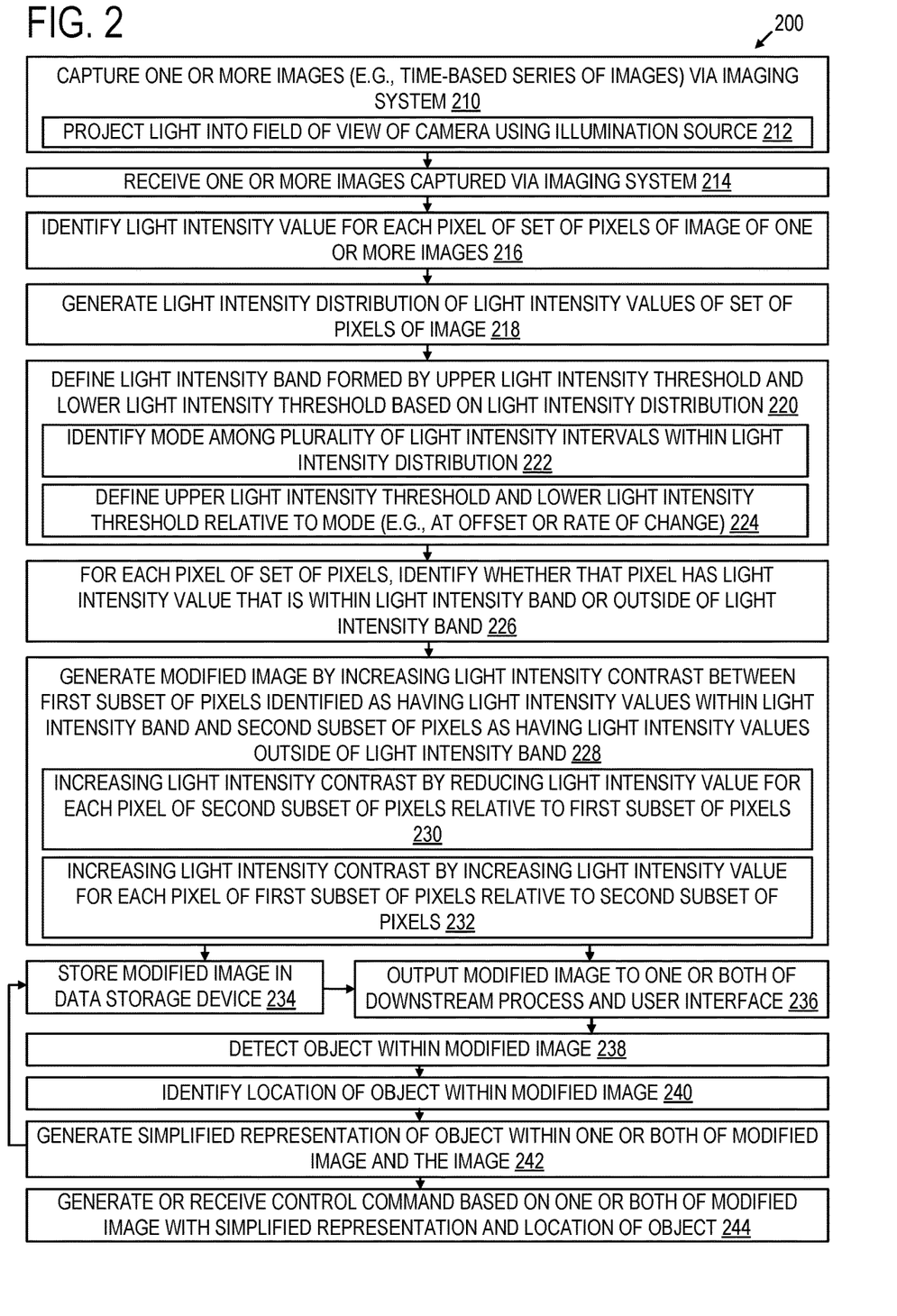
FIG. 2 is a flow diagram depicting aspects of an example computer vision method that can performed by the computer vision system of FIG. 1.

FIG. 2 shows a flow diagram depicting aspects of an example computer vision method 200. As an example, method 200 can be performed to pre-process images before application of downstream computer vision techniques, including objection detection, object tracking, object segmentation, edge detection, etc. For example, an object to be detected and tracked within the pre-processed images can include a feature (e.g., a circular rim) of drogue 118 of FIG. 1.

According to method 200, a subject image is processed to generate a modified image that can be provided to downstream processes and user interfaces, for example, to assist in performing a task based on the modified image. The modified image can be a modified version of the subject image or a modified version of a subsequent image in relation to the subject image. In at least some examples, aspects of method 200 described with reference to the subject image can be performed for each image or a subset of the time-based series of images by repeating some or all of the operations of method 200 to obtain a time-based series of modified images (e.g., a modified video).

Method 200 can be performed, at least in part, by a computing system, such as example computing system 162 of FIG. 1, which can include one or more computing devices 132 of computer vision platform 130. Additionally or alternatively, the computing system performing method 200 can include one or more remote computing devices 160. For example, the computing system can execute instructions (e.g., of computer vision module 134 of FIG. 1) at one or more logic devices (e.g., processors) to perform aspects of method 200.

At 210, the method can include capturing one or more images via an imaging system. In an example, the one or more images can form part of a time-based series of images captured via the imaging system. The time-based series of images, in an example, can form a video having a frame rate in which each frame corresponds to a respective image of the time-based series. The imaging system can refer to example imaging system 136 of FIG. 1, for example. Accordingly, the imaging system can include a camera (e.g., 144 of FIG. 1) that captures the one or more images at 210.

In examples where the imaging system includes an illumination source (e.g., 146 of FIG. 1), the method at 212 can further include projecting light into a field of view of the camera using the illumination source. The one or more images captured at 210 can include infrared images in the case of the camera being configured to capture light within the infrared range of electromagnetic spectrum, including infrared light projected by the illumination source at 212 that is reflected from objects present within the field of view of the camera. An example of an infrared range of electromagnetic spectrum that can be used with method 200 includes Long Wavelength InfraRed (LWIR), which includes wavelengths of 8 µm to 14 µm. However, the one or more images captured at 210 can additionally or alternatively include other ranges of electromagnetic spectrum, including other forms of infrared or visible light, as examples.

At 214, the method can include receiving one or more images captured via the imaging system at 210. As an example, the computing system can receive the time-based series of images from the camera as a video or image stream. As described in further detail with reference to FIG. 4, each of the images received at 214 can include an array of pixels in which each pixel has a respective pixel identifier and an associated light intensity value measured by the camera for that pixel. Within the context of an infrared image, for example, the light intensity value for each pixel represents the infrared light intensity as measured by the camera for that pixel. In at least some examples, the computing system can buffer or otherwise store the raw images captured at 210 for processing, including for real-time, near-real-time (e.g., best effort), or offline processing.

At 216, the method can include identifying a light intensity value for each pixel of a set of pixels of an image of the one or more images received at operation 214. The set of pixels can include some or all of the pixels of the image. The computing system can buffer or otherwise store the light intensity values identified for each pixel as part of operation 216 for subsequent processing, including for real-time, near-real-time (e.g., best effort), or offline processing.

At 218, the method can include generating a light intensity distribution of the light intensity values of the set of pixels of the image. As an example, the light intensity distribution is a light intensity histogram of the set of pixels. An example light intensity histogram is described in further detail with reference to FIG. 3. The light intensity histogram can include a plurality of intervals across a range of light intensity values in which each interval is a respective subrange of light intensity values. For each interval, the light intensity histogram can identify a quantity of pixels of the set of pixels having light intensity values that are within the interval.

At 220, the method can include defining a light intensity band formed by an upper light intensity threshold and a lower light intensity threshold based on the light intensity distribution generated at operation 218. As part of operation 220, the method at 222 can include identifying a mode among a plurality of light intensity intervals within the light intensity distribution.

Additionally, as part of operation 220, the method at 224 can include defining the upper light intensity threshold and the lower light intensity threshold relative to the mode identified at operation 222. Examples techniques for defining the upper light intensity threshold and the lower light intensity threshold relative to the mode are described with reference to FIG. 3. As an example, defining the upper light intensity threshold can be based on the light intensity value at a first pixel quantity offset from the mode within the light intensity distribution, and defining the lower light intensity threshold can be based on the light intensity value at a second pixel quantity offset from the mode within the light intensity distribution. As another example, defining the upper light intensity threshold can be based on based on a light intensity value at which a rate of change of light intensity decreases to a first target rate of change relative to the mode within the light intensity histogram, and defining the upper light intensity threshold can be based a light intensity value at which a rate of change of light intensity increases to a second target rate of change relative to the mode within the light intensity histogram.

At 226, the method can include, for each pixel of the set of pixels, identifying whether that pixel has a light intensity value that is within the light intensity band or outside of the light intensity band. For example, the light intensity value of each pixel of the set can be compared to the upper and lower light intensity thresholds to determine whether the light intensity value of that pixel is within the light intensity band or outside of the light intensity band.

At 228, the method can include generating a modified image by increasing a light intensity contrast between a first subset of pixels identified as having light intensity values within the light intensity band and a second subset of pixels identified as having light intensity values outside of the light intensity band. As an example, increasing the light intensity contrast can include, at 230, reducing the light intensity value for each pixel of the second subset of pixels relative to the first subset of pixels. Additionally or alternatively, increasing the light intensity contrast can include, at 232, increasing the light intensity value for each pixel of the first subset of pixels relative to the second subset of pixels.

In an example, the first subset of pixels and the second subset of pixels are of the set of pixels of the image for which the light intensity distribution is generated at operation 218. However, in another example, the first subset of pixels and the second subset of pixels are pixels of another image captured after the image within a time-based series of images captured by the camera at operation 210. In this example, the modified image uses the light intensity distribution obtained from a previous image to the image for which the modified image is generated at operation 228. An example of this approach is described in further detail with reference to FIG. 4.

At 234, the method can include storing the modified image in a data storage device. As an example, the modified image can be stored in a buffer or other suitable storage configuration as an individual modified image or as a time-based series of modified images for the time-based series of images that can be captured by the imaging system at 210.

At 236 the method can include outputting the modified image to one or both of a downstream process and a user interface. As an example, the downstream process can include an object detector component of computer vision module 134 of FIG. 1, described in further detail with reference to FIG. 4. As another example, the user interface can include a graphical user interface (GUI) presented via a display device, enabling a human operator to reference the modified image as part of performing a task. Outputting the modified image at 236 can include outputting the modified image within a time-based series of modified images respectively generated from images received at 214 (e.g., as a modified video). In at least some examples, the modified image output at 236 can be retrieved from a data storage device, such as from the location where the modified image was previously stored at 234.

From either of operations 234 or 236, a control command that is based on the modified image can be generated or received at 238 from another downstream process or user interface. As an example, an automation module executed by a computing system can receive one or both of a location of an object and the simplified representation of the object as input, and can generate a particular control command to a controlled device in response to the input. Within the context of aerial refueling operation 110 of FIG. 1, for example, the control command can be provided to one or more control interfaces 138 to control operation of second aeronautical vehicle 114, such as to direct probe 120 to within drogue 118. As another example, a human operator can provide a control command via user interfaces 140 responsive to presentation of the modified image with the simplified representation, such as to direct probe 120 to within drogue 118.

In at least some examples, the modified image output at operation 236 can be further processed by one or more of operations 238, 240, 242, and 244. At 238, the method can include detecting an object (e.g., a circular rim of drogue 118 of FIG. 1) within the modified image. At 240, a location of the object can be identified within the modified image. As an example, the location can be represented by a point or collection of pixels.

At 242, a simplified representation of the object within one or more both of the modified image or the image (e.g., obtained at operation 214) can be generated. The simplified representation can take the form of a predefined geometric shape (e.g., circle, oval, square, etc.), as an example. In at least some examples, this simplified representation can generally correspond to a feature of the object detected within the modified image, such as a simplified representation that forms a circle overlaid upon a circular rim of refueling drogue present within the subject image.

From operation 242, the method can return to operation 234 where the modified image with the simplified representation can be stored in a data storage device. Additionally, at operation 236, the modified image with the simplified representation can be output to one or both of a downstream process and user interface. As part of operation 236, the downstream process can include an automation module implemented by a computing system, described in further detail with reference to FIG. 4. As another example, the user interface can include a graphical user interface (GUI) presented via a display device, enabling a human operator to reference the modified image with the simplified representation as part of performing a task.

At 244, the method can include, generating or receiving a control command that is based on the modified image with the simplified representation and the location of the object identified within the modified image can be generated or received (e.g., from another downstream process or user interface). As an example, an automation module executed by a computing system can receive one or both of the location of the object and the simplified representation of the object as input, and can generate a particular control command to a controlled device in response to the input. Within the context of aerial refueling operation 110 of FIG. 1, for example, the control command can be provided to one or more control interfaces 138 to control operation of second aeronautical vehicle 114, such as to direct probe 120 to within drogue 118. As another example, a human operator can provide a control command via user interfaces 140 responsive to presentation of the modified image with the simplified representation, such as to direct probe 120 to within drogue 118. In at least some examples, method 200 can be repeated for each image of the time-based series of images.

Figure 3:
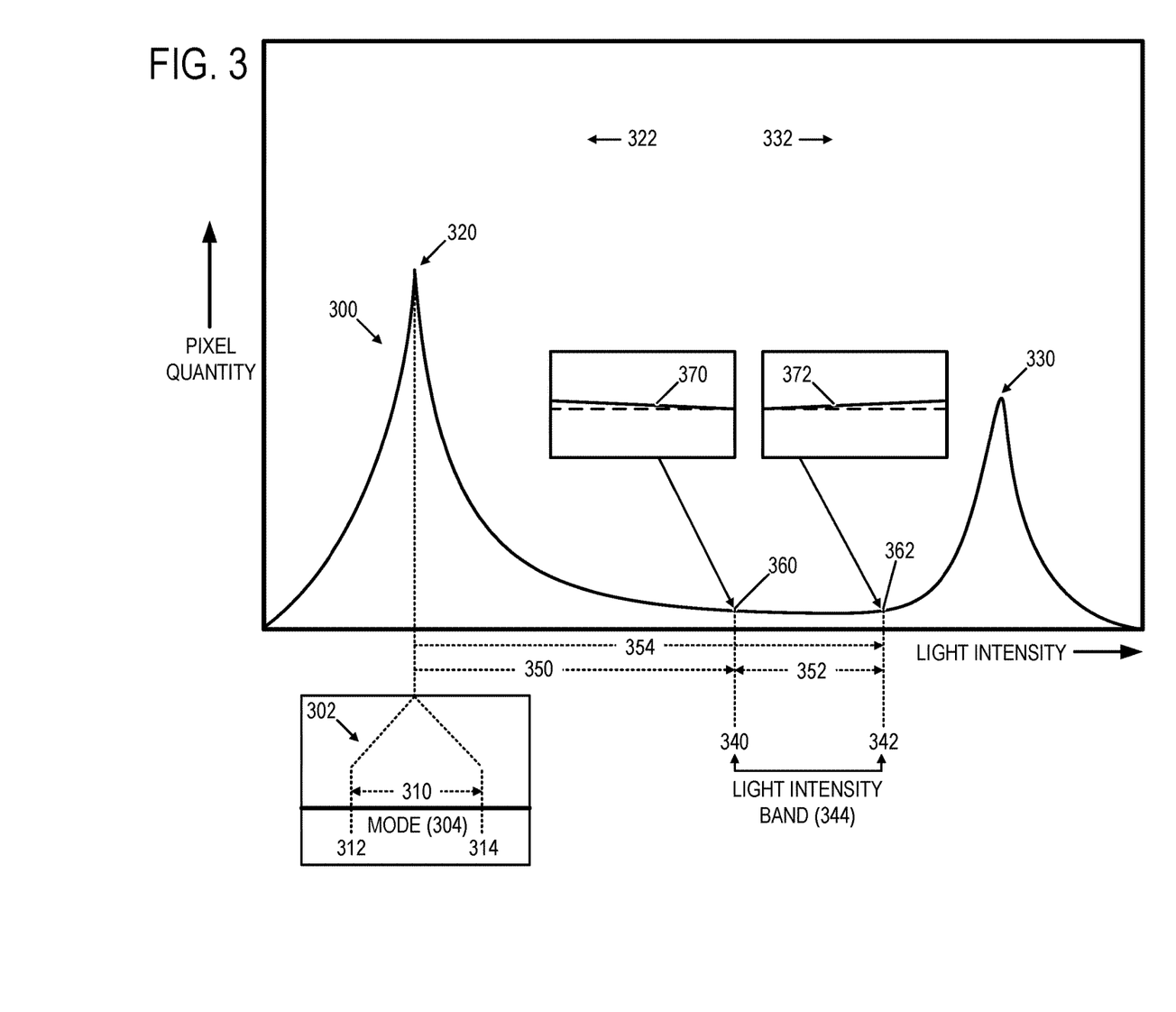
FIG. 3 depicts an example light intensity distribution.

FIG. 3 depicts an example light intensity distribution 300 of light intensity values for a set of pixels of an image. In this example, distribution 300 is a light intensity histogram. As a histogram, distribution 300 can identify a quantity of pixels (e.g., along the vertical axis) of the set of pixels for each of a plurality of light intensity value subranges or intervals (e.g., along the horizontal axis).

Within the context of a light intensity histogram, the plurality of light intensity value subranges or intervals can be defined to provide a suitable resolution within a range of light intensity values measured by a camera that captured the image. As an example, the range of light intensity values can be divided into a predefined quantity of light intensity subranges or intervals, which can include tens, hundreds, thousands, or more subranges or intervals.

FIG. 3 includes an expanded view 302 of an example light intensity value subrange or interval 310 that is defined by a lower light intensity value 312 and an upper light intensity value 314. For a light intensity histogram, each light intensity subrange or interval of distribution 300 can be defined by a respective lower light intensity value and a respective upper light intensity value as described with reference to example interval 310.

Within example distribution 300, a first localized maximum pixel quantity 320 is present at a lower end 322 of a light intensity range of the distribution. In this example, first localized maximum pixel quantity 320 corresponds to example interval 310. Distribution 300, in this example, further includes a second localized maximum pixel quantity 330 at a higher end 332 of the light intensity range of the distribution, progressing in a direction of increasing light intensity value from the first localized maximum pixel quantity 320. The first localized maximum pixel quantity 320 is greater than the second localized maximum pixel quantity 330, in this example, and the first localized maximum pixel quantity is the overall maximum pixel quantity of distribution 300. Thus, in this example, interval 310 represents a mode 304 of distribution 300 for which the first localized maximum pixel quantity 320 is the overall maximum pixel quantity of the distribution. In other examples, first localized maximum pixel quantity 320 can be less than other localized maximum pixel quantities of the distribution. In examples where the first localized maximum pixel quantity 320 is not the overall maximum pixel quantity of the distribution, mode 304 can refer to a localized mode at lower end 322 of distribution 300.

As previously described with reference to method 200 of FIG. 2, a light intensity band can be formed by a lower light intensity threshold and an upper light intensity threshold that are defined relative to a mode of a light intensity distribution. Within example distribution 300 of FIG. 3, one or both of a lower light intensity threshold 340 and an upper light intensity threshold 342 forming a light intensity band 344 can be defined relative to mode 304.

As a first example, lower light intensity threshold 340 can be defined by a first offset 350 (e.g., a first positive light intensity variance) relative to mode 304, progressing in a direction of increasing light intensity from mode 304. First offset 350 can define a first range of lower light intensity threshold 340 from mode 304. First offset 350 can define a predefined quantity of pixels within distribution 300 or a predefined light intensity value. In the case of first offset 350 being a predefined quantity of pixels, this predefined quantity of pixels can be based on a total quantity of pixels of the image (e.g., a predefined proportion of pixels of the image). In the case of first offset 350 being a predefined light intensity value, this predefined light intensity value can be based on a feature of distribution 300, such as a proportion of a light intensity difference between first localized maximum pixel quantity 320 and second localized maximum pixel quantity 330 within the distribution.

Progressing in a direction of increasing light intensity from mode 304, lower light intensity threshold 340 can be defined as a lower light intensity value 360. First offset 350 can be defined relative to a particular feature of interval 310 that represents mode 304, such as upper light intensity value 314, lower light intensity value 312, or an intermediate light intensity value within interval 310 (e.g., a median light intensity value) to identify lower light intensity value 360 based on first offset 350.

Upper light intensity threshold 342 can be defined as a higher light intensity value 362 as compared to lower light intensity value 360 of lower light intensity threshold 340. As an example, upper light intensity threshold 342 can be defined by an intermediate offset 352 (e.g., an intermediate variance) relative to lower light intensity threshold 340, progressing in a direction of increasing light intensity from lower light intensity value 360 of the lower light intensity threshold. Intermediate offset 352 can be a predefined quantity of pixels within distribution 300 or a predefined light intensity value. The predefined quantity of pixels of intermediate offset 352 can be based on a total quantity of pixels of the image (e.g., a predefined proportion), or the predefined light intensity value of offset 352 can be based on a feature of distribution 300, such as a proportion of a light intensity difference between lower light intensity value 360 and second localized maximum pixel quantity 330 within the distribution.

Alternatively or additionally, upper light intensity threshold 342 can be defined relative to mode 304 by a second offset 354 (e.g., a second positive light intensity variance), progressing in a direction of increasing light intensity from mode 304. Second offset 354 can define a second range of upper light intensity threshold 342 from mode 304 that is larger than the first range defined by first offset 350. Second offset 354 can define a predefined quantity of pixels within distribution 300 or a predefined light intensity value, such as previously described with reference to offsets 350 and 352.

As one example of the above described offset-based techniques, first offset 350 can correspond to an offset of 350 pixels relative to mode 304, and second offset 354 can correspond to an offset of 855 pixels relative to mode 304. In this example, first offset represents approximately 40.9% of second offset. However, it will be understood that other suitable values can be used.

As a second example, a rate of change light intensity within distribution 300 can be used to identify one or both of lower light intensity threshold 340 and upper light intensity threshold 342. As an example, while lower light intensity threshold 340 can be defined using first offset 350 relative to mode 304, upper light intensity threshold 342 can be defined as upper light intensity value 362 at which a rate of change of light intensity within distribution 300 decreases to a target rate of change 372, progressing in a direction of decreasing light intensity from second local maximum pixel quantity 330. In this example, upper light intensity threshold 342 approximates a base of second local maximum pixel quantity 330, and pixels of second localized maximum pixel quantity 330 have a light intensity that is greater than lower light intensity threshold 340. Target rate of change 372 for identifying upper light intensity threshold 342 can be defined as zero change of light intensity over at least a predefined quantity of pixels (e.g., one or more intervals) within distribution 300. However, other suitable values can be used for target rate of change 372.

In at least some examples, second local maximum pixel quantity 330 can be selected or otherwise identified as a localized peak in pixel quantity within distribution 300 that exceeds a threshold pixel quantity, progressing in a direction of increasing light intensity from mode 304 or from lower light intensity threshold 340. However, other suitable techniques can be used to select or otherwise identify second local maximum pixel quantity 330 within distribution 300.

Alternatively, upon defining lower light intensity threshold 340 using first offset 350 relative to mode 304, upper light intensity threshold 342 can be defined as upper light intensity value 362 at which a rate of change of light intensity within distribution 300 increases to target rate of change 372, progressing in a direction of increasing light intensity from lower light intensity threshold 340.

As yet another example, lower light intensity threshold can be defined as lower light intensity value 360 at which a rate of change of light intensity within distribution 300 decreases to a target rate of change 370, progressing in a direction of increasing light intensity from first local maximum pixel quantity 320. Target rate of change 370 for identifying lower light intensity threshold 340 can be defined as zero change of light intensity over at least a predefined quantity of pixels (e.g., one or more intervals) within distribution 300. However, other suitable values can be used for target rate of change 370.

Figure 4:
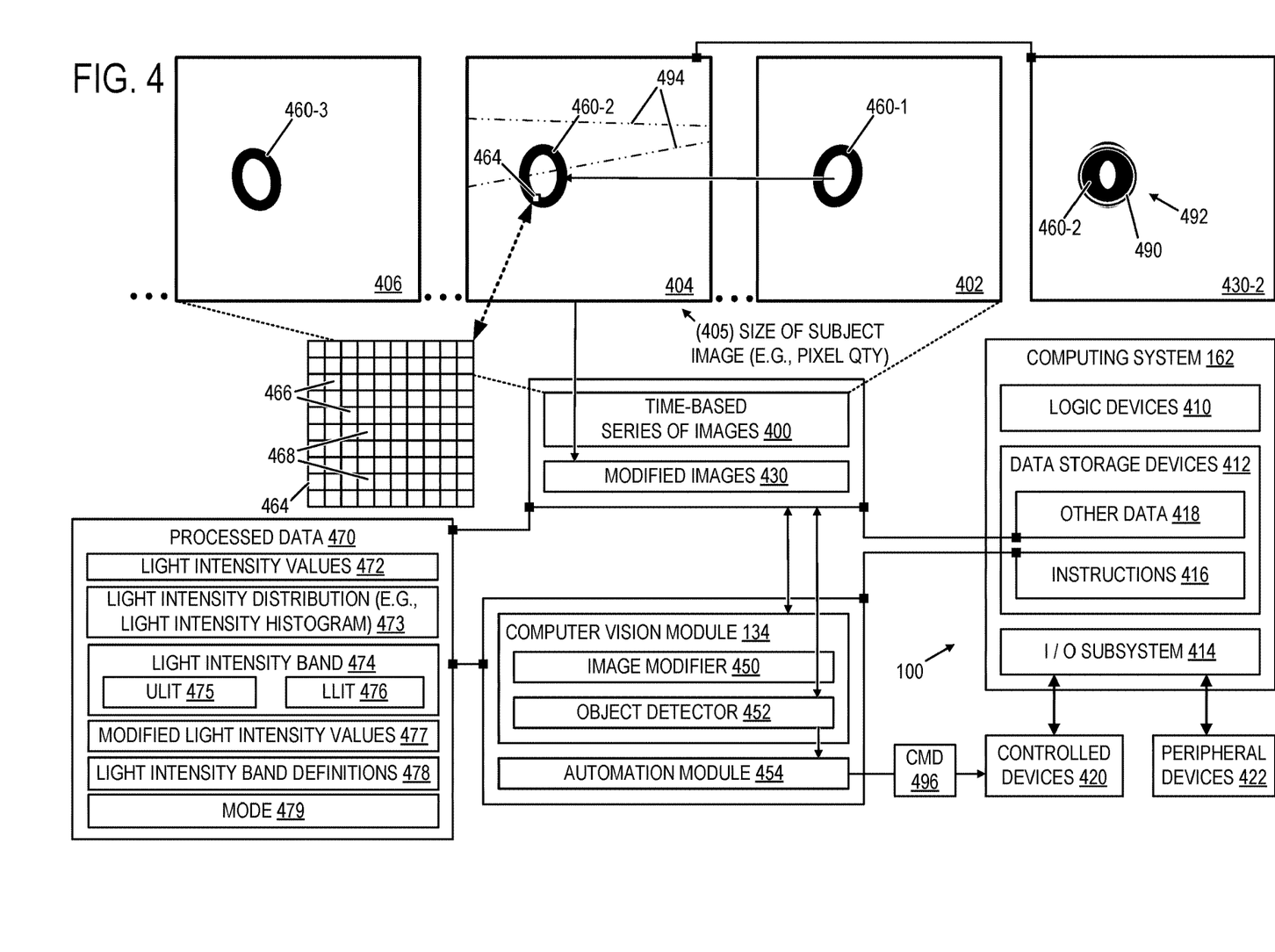
FIG. 4 is a schematic diagram depicting additional aspects of the computer vision system of FIG. 1 processing an example time-based series of images.

FIG. 4 is a schematic diagram depicting additional aspects of computer vision system 100 of FIG. 1 processing an example time-based series of images 400. Within FIG. 4, images 400 include at least image 402, image 404, image 406, etc. In this example, image 402 was captured prior to image 404, and image 404 was captured prior to image 406 among images 400. An object 460-1 is present in image 402. Object 460-1 of image 402 is also present in image 404 as object 460-2 and in image 406 as object 460-3.

It will be understood that images 400 can include tens, hundreds, thousands, or more images, and such images can form a video in at least some examples. Image 404, as an example of a subject image processed by method 200 of FIG. 2, as a size 405 that can be represented by a quantity of pixels. Each image of the time-based series of images 400 can also have the same size as image 404, such as where each of the images were captured by the same camera.

Computing system 162 of FIG. 1 is depicted in further detail in FIG. 4 including one or more logic devices 410 (e.g., processor devices), one or more data storage devices 412 (e.g., memory devices), and an input/output subsystem 414. As previously described with reference to FIG. 1, computing system 162 can include one or more computing devices 132 that form part of computer vision platform 130. Additionally or alternatively, computing system 162 can include one or more remote computing devices 160.

Data storage devices 412 include instructions 416 (e.g., one or more programs or program components) stored thereon that are executable by logic devices 410 to perform method 200 of FIG. 2. Instructions 416 include computer vision module 134 of FIG. 1. Computer vision module 134 includes an image modifier component 450 that is executable to perform operations relating to pre-processing of images 400 to generate, store, and output modified images 430, such as previously described with reference to operations 210-236 of FIG. 2. Computer vision module 134 further includes object detector component 452 that is executable to perform operations relating to detecting objects within images 400 and within modified images 430, such as previously described with reference to operations 238, 240, and 242 of FIG. 2. Furthermore, in this example, instructions 416 include an automation module 454 that can partially or fully automate control operations or other tasks based on objects detected by object detector 452 of computer vision module 134, such as previously described with reference to operation 244 of FIG. 2.

Data storage devices 412 further include other data 418 stored thereon, which can include data representing images 400, modified images 430, processed data 470 generated or otherwise obtained by one or both of computer vision module 134 and automation module 454 through performance of the methods and techniques disclosed herein, among other suitable forms of data.

Within FIG. 4, light intensity values 472 for the set of pixels of image 404 are depicted within processed data 470. Within FIG. 4, a detailed subregion 464 of image 404 is shown in further detail as including an array of pixels that includes a first subset of pixels 466 that are within light intensity band 474, and a second subset of pixels 468 that are outside of the light intensity band.

Other examples of processed data 470 include a light intensity distribution 473 (e.g., light intensity distribution 300 of FIG. 3 as a light intensity histogram); light intensity band 474 (e.g., 344 of FIG. 3) that is formed by an upper light intensity threshold (ULIT 475) and a lower light intensity threshold (LLIT 476); modified light intensity values 477 that include light intensity values of pixels of modified images 430; and light intensity band definition 478, which can define offsets 350, 352, and 354, target rate of change 370, and target rate of change 372 previously described with reference to FIG. 3; and a mode 479 (e.g., mode 304 of FIG. 3) within light intensity distribution 473.

An example modified image 430-2 for image 404 is depicted schematically in FIG. 4. In this example, modified image 430-2 includes a simplified representation 490 of object 460-2 that has been generated within the modified image by computer vision module 134. For example, object 460-2 has been identified at a location 492 by object detector 452. In at least some examples, the simplified representation can take the form of a geometric shape that represents an ideal view (e.g., an orthogonal view) of a feature of the object. For example, if object 460-2 to be detected within image 404 is a drogue (e.g., drogue 118 of FIG. 1) having a circular rim that defines an opening that is configured to receive a probe (e.g., probe 120 of FIG. 1), the geometric shape of simplified representation 490 can take the form of a circle that represents the circular rim of the drogue. Simplified representation 490 can assist human operators and downstream automation processes (e.g., of automation module 454) to perform a task that utilizes the modified image as input (e.g., visual feedback).

Within modified image 430-2, visual features representing other objects 494 present within image 404 can have a different appearance or can be no longer present within the modified image, for example, as a result of modification of pixel intensity values. For example, certain visual features of one or both of object 460-2 and objects 494 can be enhanced or diminished.

As shown schematically in FIG. 4, modified images 430, including modified image 430-2 can be used by object detector 452 to detect object 460-2 within image 404, and the location of the detected object can be provided as input to automation module 454. In this example, automation module 454 generates a control command 496 (CMD 496 in FIG. 4) based on the location of the object within image 404 that can be provided as input to controlled devices 420 (e.g., via control interface 138 of FIG. 1).

Within FIG. 4, input/output subsystem 414 of computing system 162 can include the previously described control interfaces 138, user interfaces 140, and communications interfaces 142 of FIG. 1, as well as analogous interfaces of remote computing devices 160. Peripheral devices 422 can include imaging system 136 of FIG. 1, including camera 144 and illumination source 146. Additionally, peripheral devices 422 can include user input devices and output devices, such as a graphical display for displaying modified images 430, human operator control devices for providing a control input, etc.

Figure 5A:
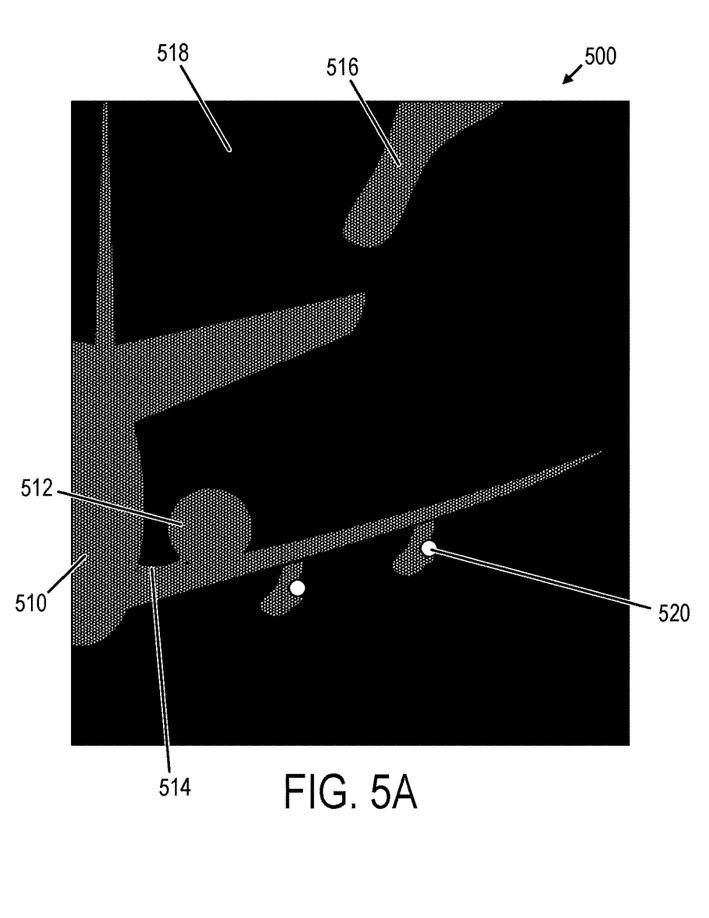
FIG. 5A shows an example image that can be captured and processed by the computer vision system of FIG. 1 performing aspects of the method of FIG. 2.

FIG. 5A shows an example image 500 that can be captured and processed by computer vision system 100 of FIG. 1 performing aspects of method 200 of FIG. 2. Features present within image 500 in this example is represented schematically by crosshatching for purposes of illustration. Image 500 can take the form of an infrared image captured via an infrared camera, as an example.

Image 500 includes features that can be difficult for computer vision systems and computer vision techniques to process to identify a target object within the image. For example, image 500 includes a portion of an aircraft (e.g., aeronautical vehicle 112 of FIG. 1), a drogue 512 (e.g., drogue 118 of FIG. 1), a hose 514 (e.g., hose 116 of FIG. 1) connecting drogue 512 to aircraft 510, and probe 516 (e.g., probe 120 of FIG. 1) that have a light intensity value within image 500 that is similar to or otherwise insufficiently distinguishable (for purposes of at least some computer vision systems and techniques) from each other or a background light intensity value within a background region 518 of the image. Other regions of image 500 such as region 520 has a higher light intensity value as compared to background region 518 and the previously described aircraft 510, drogue 512, hose 514, probe 516, etc. In this example, region 520 represents an exhaust port of an aircraft engine, which is captured by the infrared camera as a high light intensity value.

Figure 5B:
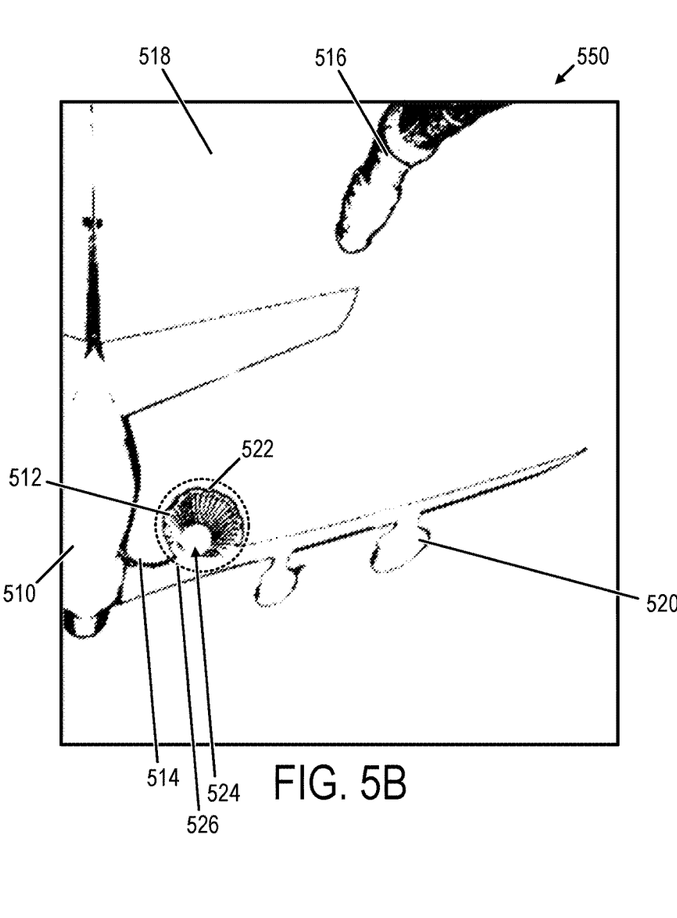
FIG. 5B shows an example modified image of the image of FIG. 5A that can be generated by the computer vision system of FIG. 1 performing aspects of the method of FIG. 2.

FIG. 5B shows an example modified image 550 of image 500 of FIG. 5A that can be generated by computer vision system 100 of FIG. 1 performing aspects of method 200 of FIG. 2. Within the example of FIGS. 5A and 5B, a circular rim 522 defining an of opening of drogue 512 is to be detected as a target object within modified image 550. The features of drogue 512 including circular rim 522 are more distinguishable from background region 518, hose 514, aircraft 510, etc. Thus, the features of drogue 512 including circular rim 522 can be more easily detected by computer vision systems and computer vision techniques.

For example, pixels of image 500 of FIG. 5A having a light intensity value that is within a light intensity band are represented in modified image 550 as black pixels whereas pixels of image 500 of FIG. 5A having a light intensity value that is outside of the light intensity band are represented in the modified image as white pixels. It will be understood that the black and white pixels in this example can be reversed in other examples while still enabling or improving performance of computer vision systems and computer vision techniques. Region 520 of image 500 having a higher light intensity value than the light intensity band and background region 518 of image 500 having a lower light intensity value than the light intensity band are both represented in modified image 550 by white pixels.

By contrast, pixels of drogue 512 including circular rim 522 have a light intensity value within image 500 that is within the light intensity band. Thus, pixels of drogue 512 including circular rim 522 are represented in modified image 550 by black pixels that contrast with the white pixels of the modified image. Upon detection of circular rim 522 of drogue 512, for example, by application of an object detector (e.g., 452) of a computer vision module (e.g., 134) to modified image 550, a location 524 of drogue 512 that is defined by circular rim 522 can be identified. In this example, location 524 is represented or surrounded by a simplified representation 526 of circular rim 522 that has been added to modified image 550. In other examples, simplified representation 526 can be omitted or can take other suitable forms. Inclusion of simplified representation 526 can assist human operators or automated processes identify location 524 within modified image 550 (or alternatively within image 500). For example, probe 516 can be controlled to be inserted through circular rim 522 at location 524 using simplified representation 526 to guide the probe.

The various methods and operations described herein may be tied to a computing system of one or more computing devices. In particular, such methods and operations can be implemented as one or more computer-application programs, a computer-implemented service, an application-programming interface (API), a computer data library, other set of machine-executable instructions, or a combination of these examples.

As previously described, FIGS. 1 and 4 schematically depict aspects of an example computing system that includes one or more computing devices. A computing system or computing devices thereof can take the form of one or more personal computers, server computers, tablet computers, networking computers, mobile computers, computers integrated into other devices or machinery, other computing devices, or combinations of these examples. While components of an example computing system are described in further detail below, it will be understood that any of the computing systems or computing devices described herein can also include one or more logic devices, one or more data storage devices, an input/output subsystem, and other suitable components.

A logic device, as described herein, includes one or more physical devices configured to execute instructions. For example, a logic device may be configured to execute instructions that are part of one or more applications, services, programs, routines, libraries, objects, components, data structures, or other logical constructs. Such instructions may be implemented to perform a task, implement a data type, transform the condition of one or more components, achieve a technical effect, or otherwise arrive at a desired result.

A logic device can include one or more processor devices configured to execute software instructions. Additionally or alternatively, a logic device may include one or more hardware or firmware logic devices configured to execute hardware or firmware instructions. Processor devices of a logic device can be single-core or multi-core, and the instructions executed thereon may be configured for sequential, parallel, and distributed processing. Individual components of a logic device can be distributed among two or more separate devices, can be remotely located, and can be configured for coordinated processing. Aspects of a logic device can be virtualized and executed by remotely accessible, networked computing devices configured in a cloud-computing configuration.

A data storage device, as described herein, includes one or more physical devices configured to hold instructions or other data executable by a logic device to implement the methods and operations described herein. When such methods and operations are implemented, a condition or state of the data storage device can be transformed—e.g., to hold different data. The data storage device can include one or both of removable devices and built-in devices. A data storage device can include optical memory, semiconductor memory (e.g., RAM, EPROM, EEPROM, etc.), and magnetic memory (e.g., hard-disk drive, floppy-disk drive, tape drive, MRAM, etc.), among others. A data storage device can include volatile, nonvolatile, dynamic, static, read/write, read-only, random-access, sequential-access, location-addressable, file-addressable, and content-addressable devices. While a data storage device, includes one or more physical devices, aspects of the executable instructions described herein alternatively can be propagated by a communication medium (e.g., an electromagnetic signal, an optical signal, etc.) that is not held by a physical device for a finite duration, under at least some conditions.

Aspects of a logic device and a data storage device of a computing device or computing system can be integrated together into one or more hardware-logic components. Such hardware-logic components can include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module" and "program" are used herein to describe an aspect of a computing system implemented to perform a particular function. In at least some examples, a module or program can be instantiated via a logic device executing instructions held by or retrieved from a data storage device. It will be understood that different modules or programs can be instantiated from the same application, service, code block, object, library, routine, API, function, etc. Likewise, the same module or program can be instantiated by different applications, services, code blocks, objects, routines, APIs, functions, etc. The terms "module" or "program" can encompass individual or groups of executable files, data files, libraries, drivers, scripts, database records, etc.

In at least some examples, the computer executable instructions disclosed herein can take the form of a service that refers to a program executable across multiple sessions. A service can be available to one or more system components, programs, and other services. As an example, a service can run on one or more server computing devices.

An input/output subsystem, as described herein, can include or interface with one or more user input devices such as a keyboard, mouse, touch screen, handheld controller, microphone, camera, etc.; one or more output devices such as a display device, audio speaker, printer, etc.; and serve as a communications interface with one or more other devices.

A display device can be used to present a visual representation of data held by a data storage device of a computing device or computing system. This visual representation can take the form of a graphical user interface. As the herein described methods and operations can change the data held by a data storage device, and thus transform the condition or state of the data storage device, the condition or state of the display device can likewise be transformed to visually represent changes in the underlying data. Display devices can be combined with one or both of a logic device and a data storage device of a computing device or computing system in a shared enclosure, or such display devices can be peripheral display devices.

A communications interface of a computing device can be used to communicatively couple the computing device with one or more other computing devices. The communications interface can include wired and wireless communication devices compatible with one or more different communication protocols. In at least some examples, the communications interface can allow the computing device to send and receive messages to and from other devices via a communications network, which can include the Internet or a portion thereof, wireless radio networks, or other suitable types of networks.

Examples of the present disclosure are provided in the following enumerated paragraphs.

A.1. A computer vision method (e.g., 200) performed by a computing system (e.g., 162), the method comprising: receiving (e.g., 214) an image (e.g., 404); identifying (e.g., 216) a light intensity value (e.g., 472) for each pixel of a set of pixels (e.g., 464) of the image; defining (e.g., 220) a light intensity band (e.g., 344) formed by an upper light intensity threshold (e.g., 342) and a lower light intensity threshold (e.g., 340) based on a light intensity distribution (e.g., 300) of the light intensity values of the set of pixels; for each pixel of the set of pixels, identifying (e.g., 226) whether the light intensity value of that pixel is within the light intensity band or outside of the light intensity band; and generating (e.g., 228) a modified image (e.g., 430-2) by increasing a light intensity contrast between a first subset of pixels (e.g., 466) identified as having light intensity values within the light intensity band and a second subset of pixels (e.g., 468) identified as having light intensity values outside of the light intensity band.

A.2. The method of paragraph A.1, wherein the first subset of pixels and the second subset of pixels are of the set of pixels of the image.

A.3. The method of paragraph A.1, wherein the first subset of pixels and the second subset of pixels are pixels of another image (e.g., 404) captured after the image within a time-based series of images captured by a camera.

A.4. The method of any of paragraphs A.1-A.3, wherein increasing the light intensity contrast includes reducing (e.g., 230) the light intensity value for each pixel of the second subset of pixels relative to the first subset of pixels.

A.5. The method of any of paragraphs A.1-A.4, wherein increasing the light intensity contrast includes increasing (e.g., 232) the light intensity value for each pixel of the first subset of pixels relative to the second subset of pixels.

A.6. The method of any of paragraphs A.1-A.5, wherein the light intensity distribution is a light intensity histogram of the set of pixels.

A.7. The method of paragraph A.6, further comprising: identifying (222) a mode (304) of the light intensity values of the set of pixels within the light intensity histogram.

A.8. The method of paragraph A.7, wherein the method further comprises: defining the lower light intensity threshold based on a first offset (350) from the mode, progressing in a direction of increasing light intensity within the light intensity histogram.

A.9. The method of paragraph A.8, wherein the method further comprises: defining the upper light intensity threshold based on an intermediate offset (352) from the lower light intensity threshold or a second offset (354) from the mode, progressing in a direction of increasing light intensity within the light intensity histogram.

A.10. The method of paragraph A.8, wherein the method further comprises: defining the upper light intensity threshold based on a rate of change of light intensity within the light intensity histogram decreasing to a target rate of change (372), progressing in a direction of decreasing light intensity from a localized maximum pixel quantity (330) within the light intensity histogram having a light intensity that is greater than the lower light intensity threshold.

A.11. The method of paragraph A.10, wherein the target rate of change is zero change of light intensity.

A.12. The method of paragraph A.8, wherein the method further comprises: defining the upper light intensity threshold based on a rate of change of light intensity within the light intensity histogram increasing to a target (372) rate of change, progressing in a direction of increasing light intensity from the lower light intensity threshold.

A.13. The method of paragraph A.8, wherein the first offset defines a pixel quantity or a light intensity value.

A.14. The method of any of paragraphs A.1-A.13, wherein the light intensity values of the image are infrared light intensity values captured by an infrared camera (e.g., 144).

A.15. The method of any of paragraphs A.1-A.14, further comprising: detecting (e.g., 238) an object (e.g., 460-2) within the modified image.

A.16. The method of paragraph A.15, further comprising: generating (e.g., 244) a control command (e.g., 496) based on a location (e.g., 492) of the object within the modified image.

B.1. A computer vision system (e.g., 100), comprising: a computing system (e.g., 162) of one or more computing devices (e.g., 132) programmed with instructions (e.g., 416) executable by the computing system to: receive (e.g., 214) an image (e.g., 404); identify (e.g., 216) a light intensity value (e.g., 472) for each pixel of a set of pixels (e.g., 464) of the image; define (e.g., 220) a light intensity band (e.g., 344) formed by an upper light intensity threshold (e.g., 342) and a lower light intensity threshold (e.g., 340) based on a light intensity distribution (e.g., 300) of the light intensity values of the set of pixels; for each pixel of the set of pixels, identify (e.g., 226) whether the light intensity value of that pixel is within the light intensity band or outside of the light intensity band; and generate (e.g., 228) a modified image (e.g., 430-2) by increasing a light intensity contrast between a first subset of pixels (e.g., 466) identified as having light intensity values within the light intensity band and a second subset of pixels (e.g., 468) identified as having light intensity values outside of the light intensity band.

B.2. The computer vision system of paragraph B.1, further comprising: an infrared illumination source (e.g., 146); and an infrared camera (e.g., 144); wherein the light intensity values of the image are infrared light intensity values captured by the infrared camera.

B.3. The computer vision system of paragraph B.2, wherein the infrared illumination source and the infrared camera are mounted upon an aeronautical vehicle (e.g., 114).

C.1. A computer vision method (e.g., 200) performed by a computing system (e.g., 162), the method comprising: receiving (e.g., 214) an image (e.g., 404); identifying (e.g., 216) a light intensity value (e.g., 472) for each pixel of a set of pixels (e.g., 464) of the image; generating (e.g., 218) a light intensity distribution (e.g., 300) of the light intensity values of the set of pixels of the image; identifying (e.g., 222) a mode (e.g., 304) within the light intensity distribution of the light intensity values of the set of pixels; defining (e.g., 220) a light intensity band (e.g., 344) formed by an upper light intensity threshold (e.g., 342) and a lower light intensity threshold (e.g., 340) based on the light intensity distribution of the light intensity values of the set of pixels relative to the mode; for each pixel of the set of pixels, identifying (e.g., 226) whether the light intensity value of that pixel is within the light intensity band or outside of the light intensity band; and generating (e.g., 228) a modified image (e.g., 430-2) by increasing a light intensity contrast between a first subset of pixels (e.g., 466) identified as having light intensity values within the light intensity band and a second subset of pixels (e.g., 468) identified as having light intensity values outside of the light intensity band.

It will be understood that the configurations and techniques described herein are exemplary in nature, and that specific embodiments and examples are not to be considered in a limiting sense, because numerous variations are possible. The specific methods described herein may represent one or more of any number of processing strategies. As such, the disclosed operations may be performed in the disclosed sequence, in other sequences, in parallel, or omitted, in at least some examples. Thus, the order of the above-described operations may be changed, in at least some examples. Claimed subject matter is not limited to implementations that solve any or all disadvantages noted in any part of this disclosure. The subject matter of the present disclosure includes all novel and non-obvious combinations and subcombinations of the various methods, systems, configurations, and other features, functions, acts, and properties disclosed herein, as well as any and all equivalents thereof.

The invention claimed is:

1. A computer vision method performed by a computing system, the method comprising:
   receiving an image;
   identifying a light intensity value for each pixel of a set of pixels of the image;
   defining a light intensity band formed by an upper light intensity threshold and a lower light intensity threshold based on a light intensity histogram of the light intensity values of the set of pixels, wherein the lower light intensity threshold is defined by a first offset from a mode of the light intensity values of the set of pixels within the light intensity histogram, progressing in a direction of increasing light intensity within the light intensity histogram;
   for each pixel of the set of pixels, identifying whether the light intensity value of that pixel is within the light intensity band or outside of the light intensity band; and
   generating a modified image by increasing a light intensity contrast between a first subset of pixels identified as having light intensity values within the light intensity band and a second subset of pixels identified as having light intensity values outside of the light intensity band.

2. The method of claim 1, wherein the first subset of pixels and the second subset of pixels are of the set of pixels of the image.

3. The method of claim 1, wherein the first subset of pixels and the second subset of pixels are pixels of another image captured after the image within a time-based series of images captured by a camera.

4. The method of claim 1, wherein increasing the light intensity contrast includes reducing the light intensity value for each pixel of the second subset of pixels relative to the first subset of pixels.

5. The method of claim 1, wherein increasing the light intensity contrast includes increasing the light intensity value for each pixel of the first subset of pixels relative to the second subset of pixels.

6. The method of claim 1, wherein the method further comprises:
   defining the upper light intensity threshold based on an intermediate offset from the lower light intensity threshold or a second offset from the mode, progressing in the direction of increasing light intensity within the light intensity histogram.

7. The method of claim 1, wherein the method further comprises:
   defining the upper light intensity threshold based on a rate of change of light intensity within the light intensity histogram decreasing to a target rate of change, progressing in a direction of decreasing light intensity from a localized maximum pixel quantity within the light intensity histogram having a light intensity that is greater than the lower light intensity threshold.

8. The method of claim 7, wherein the target rate of change is zero change of light intensity.

9. The method of claim 1, wherein the method further comprises:
   defining the upper light intensity threshold based on a rate of change of light intensity within the light intensity histogram increasing to a target rate of change, progressing in the direction of increasing light intensity from the lower light intensity threshold.

10. The method of claim 1, wherein the first offset defines a pixel quantity or a light intensity value.

11. The method of claim 1, wherein the light intensity values of the image are infrared light intensity values captured by an infrared camera.

12. The method of claim 1, further comprising:
    detecting an object within the modified image.

13. The method of claim 12, further comprising:
    generating a control command based on a location of the object within the modified image.

14. A computer vision system, comprising:
    a computing system of one or more computing devices programmed with instructions executable by the computing system to:
    receive an image;
    identify a light intensity value for each pixel of a set of pixels of the image;
    define a light intensity band formed by an upper light intensity threshold and a lower light intensity threshold based on a light intensity histogram of the light intensity values of the set of pixels, wherein the lower light intensity threshold is defined by a first offset from a mode of the light intensity values of the set of pixels within the light intensity histogram, progressing in a direction of increasing light intensity within the light intensity histogram;
    for each pixel of the set of pixels, identify whether the light intensity value of that pixel is within the light intensity band or outside of the light intensity band; and
    generate a modified image by increasing a light intensity contrast between a first subset of pixels identified as having light intensity values within the light intensity band and a second subset of pixels identified as having light intensity values outside of the light intensity band.

15. The computer vision system of claim 14, further comprising:
    an infrared illumination source; and
    an infrared camera;
    wherein the light intensity values of the image are infrared light intensity values captured by the infrared camera.

16. The computer vision system of claim 15, wherein the infrared illumination source and the infrared camera are mounted upon an aeronautical vehicle.

17. A computer vision method performed by a computing system, the method comprising:
    receiving an image;

identifying a light intensity value for each pixel of a set of pixels of the image;

generating a light intensity histogram of the light intensity values of the set of pixels of the image;

identifying a mode within the light intensity histogram of the light intensity values of the set of pixels;

defining a light intensity band formed by an upper light intensity threshold and a lower light intensity threshold based on the light intensity histogram of the light intensity values of the set of pixels relative to the mode, wherein the upper light intensity threshold is defined based on a rate of change of light intensity within the light intensity histogram decreasing to a target rate of change, progressing in a direction of decreasing light intensity from a localized maximum pixel quantity within the light intensity histogram having a light intensity that is greater than the lower light intensity threshold;

for each pixel of the set of pixels, identifying whether the light intensity value of that pixel is within the light intensity band or outside of the light intensity band; and generating a modified image by increasing a light intensity contrast between a first subset of pixels identified as having light intensity values within the light intensity band and a second subset of pixels identified as having light intensity values outside of the light intensity band.

18. The method of claim 17, further comprising:

defining the lower light intensity threshold based on a first offset from the mode, progressing in a direction of increasing light intensity within the light intensity histogram.

19. The method of claim 18, wherein the localized maximum pixel quantity is located at an upper end of a light intensity range of the light intensity histogram; and wherein the mode is a global maximum pixel quantity at a lower end of the light intensity range of the light intensity histogram that is greater than the localized maximum pixel quantity.

20. The method of claim 7, wherein the localized maximum pixel quantity is located at an upper end of a light intensity range of the light intensity histogram; and wherein the mode is a global maximum pixel quantity at a lower end of the light intensity range of the light intensity histogram that is greater than the localized maximum pixel quantity.

\* \* \* \* \*